US010491429B2

United States Patent
Lee et al.

(10) Patent No.: US 10,491,429 B2
(45) Date of Patent: Nov. 26, 2019

(54) METHOD FOR ESTIMATING NONLINEAR SELF-INTERFERENCE CHANNEL IN WIRELESS COMMUNICATION SYSTEM AND DEVICE FOR SAME

(71) Applicant: LG ELECTRONICS INC., Seoul (KR)

(72) Inventors: Sangrim Lee, Seoul (KR); Dongkyu Kim, Seoul (KR); Hyunsoo Ko, Seoul (KR); Kwangseok Noh, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 15/743,621

(22) PCT Filed: Nov. 12, 2015

(86) PCT No.: PCT/KR2015/012167
§ 371 (c)(1),
(2) Date: Jan. 10, 2018

(87) PCT Pub. No.: WO2017/010623
PCT Pub. Date: Jan. 19, 2017

(65) Prior Publication Data
US 2018/0205579 A1 Jul. 19, 2018

Related U.S. Application Data
(60) Provisional application No. 62/192,066, filed on Jul. 14, 2015.

(51) Int. Cl.
*H04B 7/005* (2006.01)
*H04L 25/03* (2006.01)
(Continued)

(52) U.S. Cl.
CPC ............. *H04L 25/03* (2013.01); *H04B 1/525* (2013.01); *H04L 5/14* (2013.01); *H04L 25/0202* (2013.01);
(Continued)

(58) Field of Classification Search
USPC ....... 370/241, 252, 276, 277, 278, 282, 286, 370/287, 289, 292
See application file for complete search history.

(56) References Cited

U.S. PATENT DOCUMENTS 6,298,035 B1   10/2001  Heiskala
7,324,613 B2    1/2008  Fang et al.
(Continued)

FOREIGN PATENT DOCUMENTS

EP   3016305      5/2016
WO   2014208953   12/2014

OTHER PUBLICATIONS

PCT International Application No. PCT/KR2015/012167, Written Opinion of the International Searching Authority dated Apr. 12, 2016, 19 pages.
(Continued)

*Primary Examiner* — Kwang B Yao
*Assistant Examiner* — Nguyen H Ngo
(74) *Attorney, Agent, or Firm* — Lee Hong Degerman Kang Waimey

(57) ABSTRACT

A method for estimating a nonlinear self-interference channel in a wireless channel system, according to the present invention, can further comprise the steps of: applying a first sequence to a first symbol; applying, to a second symbol, a sequence of which a phase is shifted from that of the first sequence by $\pi/2$; and transmitting the first symbol and the second symbol.

10 Claims, 7 Drawing Sheets

(51) Int. Cl.
  *H04L 5/14* (2006.01)
  *H04L 25/02* (2006.01)
  *H04B 1/525* (2015.01)
  *H04L 5/00* (2006.01)
  *H04J 11/00* (2006.01)

(52) U.S. Cl.
  CPC ..... *H04L 25/03146* (2013.01); *H04J 11/0036* (2013.01); *H04J 11/0063* (2013.01); *H04L 5/0032* (2013.01); *H04L 5/1461* (2013.01)

(56) References Cited

U.S. PATENT DOCUMENTS

| | | | |
|---|---|---|---|
| 8,976,641 B2 | 3/2015 | Choi et al. | |
| 2012/0201153 A1 | 8/2012 | Bharadia et al. | |
| 2012/0250608 A1* | 10/2012 | Wang | H04B 7/0421 370/328 |
| 2013/0301487 A1* | 11/2013 | Khandani | H04W 16/14 370/278 |
| 2014/0016515 A1* | 1/2014 | Jana | H04L 5/143 370/278 |
| 2015/0156003 A1* | 6/2015 | Khandani | H04L 5/143 370/278 |
| 2015/0188646 A1* | 7/2015 | Bharadia | H04L 5/1438 370/278 |
| 2016/0226653 A1* | 8/2016 | Bharadia | H04B 1/525 |
| 2016/0285504 A1* | 9/2016 | Hua | H04B 1/123 |
| 2016/0352386 A1* | 12/2016 | Mirzaei | H04B 1/525 |
| 2017/0019128 A1* | 1/2017 | Pack | H04B 1/0475 |

OTHER PUBLICATIONS

European Patent Office Application Serial No. 158983833, Search Report dated Feb. 1, 2019, 8 pages.

Ahmed, E. et al., "All-Digital Self-Interference Cancellation Technique for Full-Duplex Systems", IEEE Transactions on Wireless Communications, vol. 14, No. 7, Jul. 2015, XP011662711, 14 pages.

* cited by examiner

METHOD FOR ESTIMATING NONLINEAR SELF-INTERFERENCE CHANNEL IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2015/012167, filed on Nov. 12, 2015, which claims the benefit of U.S. Provisional Application No. 62/192,066, filed on Jul. 14, 2015, the contents of which are all hereby incorporated by reference herein in their entirety.

TECHNICAL FIELD

The present invention relates to wireless communication, and more particularly to a method and apparatus for estimating a nonlinear self-interference channel in a wireless communication system.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention is to provide a method for estimating a nonlinear self-interference channel in a wireless communication system supporting a Full Duplex Radio (FDR) scheme.

Another object of the present invention is to provide an apparatus for estimating a nonlinear self-interference channel in a wireless communication system supporting a Full Duplex Radio (FDR) scheme.

Technical tasks obtainable from the present invention are non-limited by the above-mentioned technical task, and other unmentioned technical tasks can be clearly understood from the following description by those having ordinary skill in the technical field to which the present invention pertains.

Technical Solutions

The object of the present invention can be achieved by providing a method for estimating a nonlinear self-interference channel in a wireless communication system supporting a full duplex radio (FDR) scheme including: applying a first sequence to a first symbol; applying, to a second symbol, a sequence which the first sequence is phase-shifted by $\pi/2$; and transmitting the first symbol and the second symbol. The method may further include estimating a self-interference signal due to transmission of the first symbol and the second symbol. If the same root value is used, autocorrelation between the first sequence and the sequence which the first sequence is cyclic-shifted of the first sequence may be set to zero '0'. The first symbol may include a cyclic prefix (CP) in a head portion thereof, and the second symbol includes a cyclic prefix (CP) in a head portion thereof. The first symbol and the second symbol may be consecutive symbols in a time domain. Each of the first symbol and the second symbol may be a reference signal (RS) symbol.

In accordance with another aspect of the present invention, an apparatus for estimating a nonlinear self-interference channel in a wireless communication system supporting a full duplex radio (FDR) scheme includes: a processor configured to apply a first sequence to a first symbol, and apply, to a second symbol, a sequence which the first sequence is phase-shifted by $\pi/2$; and a transmitter configured to transmit the first symbol and the second symbol. The processor may estimate a self-interference signal due to transmission of the first symbol and the second symbol. If the same root value is used, autocorrelation between the first sequence and the sequence which the first sequence is cyclic-shifted of the first sequence may be set to zero '0'. The first symbol may include a cyclic prefix (CP) in a head portion thereof, and the second symbol may include a cyclic prefix (CP) in a head portion thereof. The first symbol and the second symbol may be consecutive symbols in a time domain. Each of the first symbol and the second symbol may be a reference signal (RS) symbol.

Advantageous Effects

As is apparent from the above description, exemplary embodiments of the present invention can efficiently remove not only a self-interference signal of a legacy linear component but also a self-interference signal of a nonlinear component using an inventive sequence design and an inventive detection algorithm of the embodiments of the present invention.

Effects obtainable from the present invention are non-limited by the above mentioned effect. And, other unmentioned effects can be clearly understood from the following description by those having ordinary skill in the technical field to which the present invention pertains. Namely, effects unintended in implementing the present invention can be derived from the embodiments of the present invention by those having ordinary skill in the technical field to which the present invention pertains as well.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Figure 1:
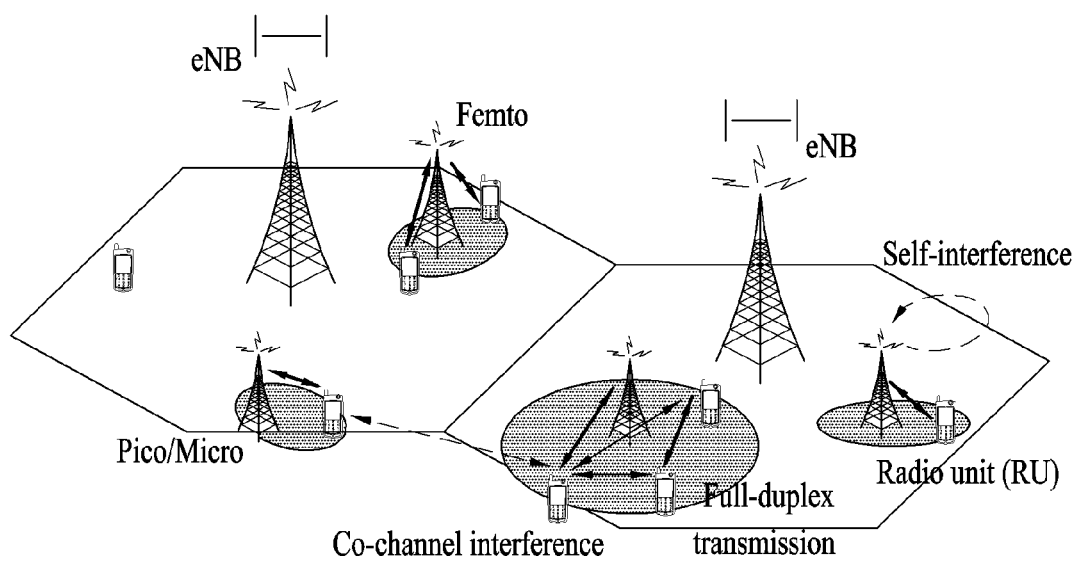
FIG. 1 is a view exemplarily illustrating a network supporting a full/half duplex communication operation mode of a UE according to the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
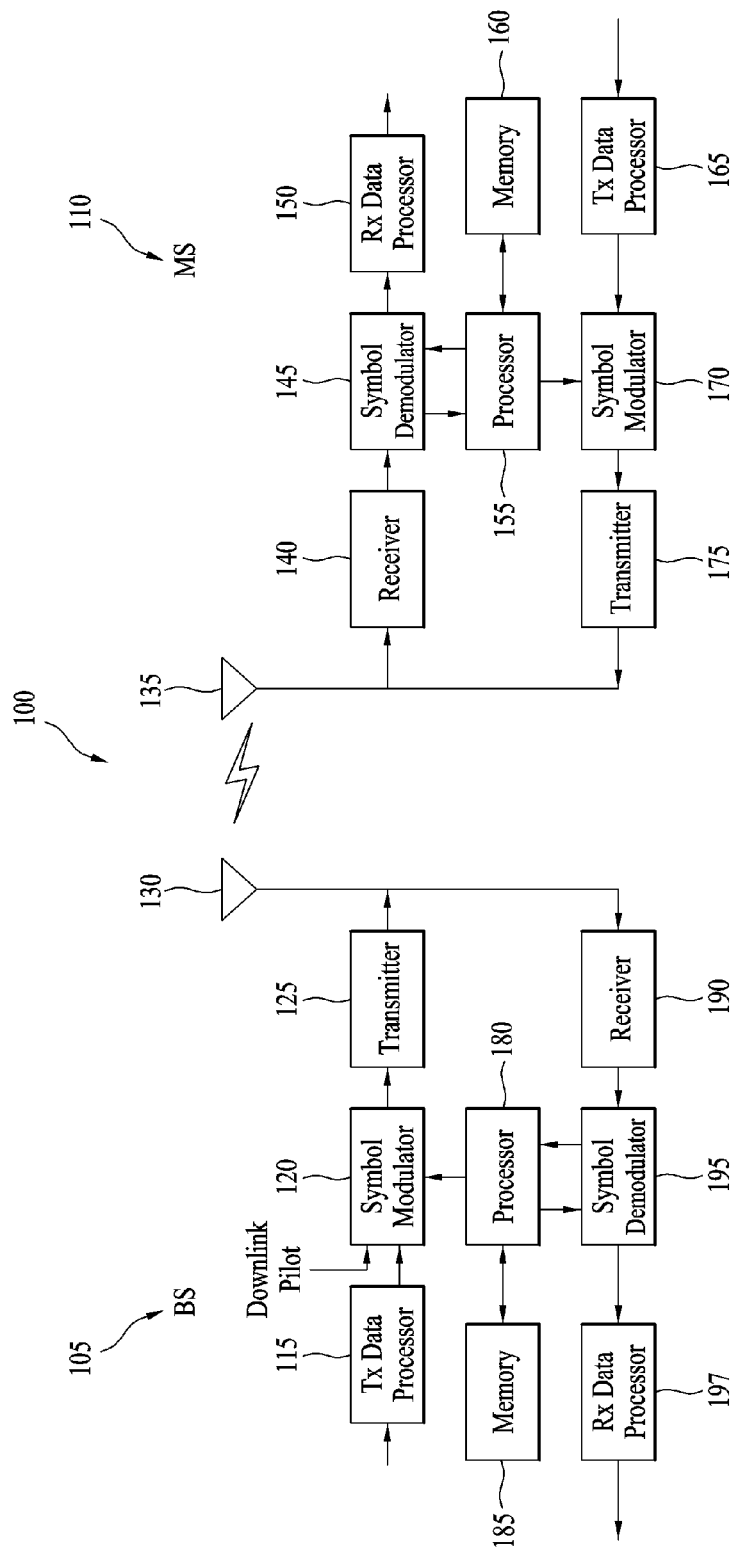
FIG. 2 is a block diagram for configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
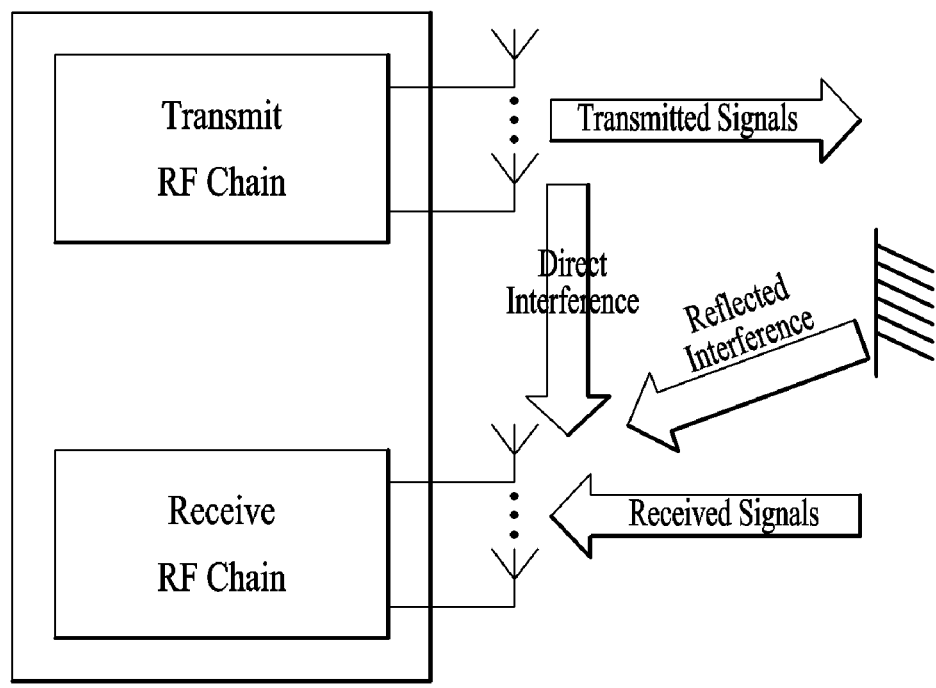
FIG. 3 is a diagram showing the concept of a transmission/reception link and self-interference (SI) in an FDR communication situation.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 1 below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed to $N_{0,BW}$=−174 dBm+10×log$_{10}$ (BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
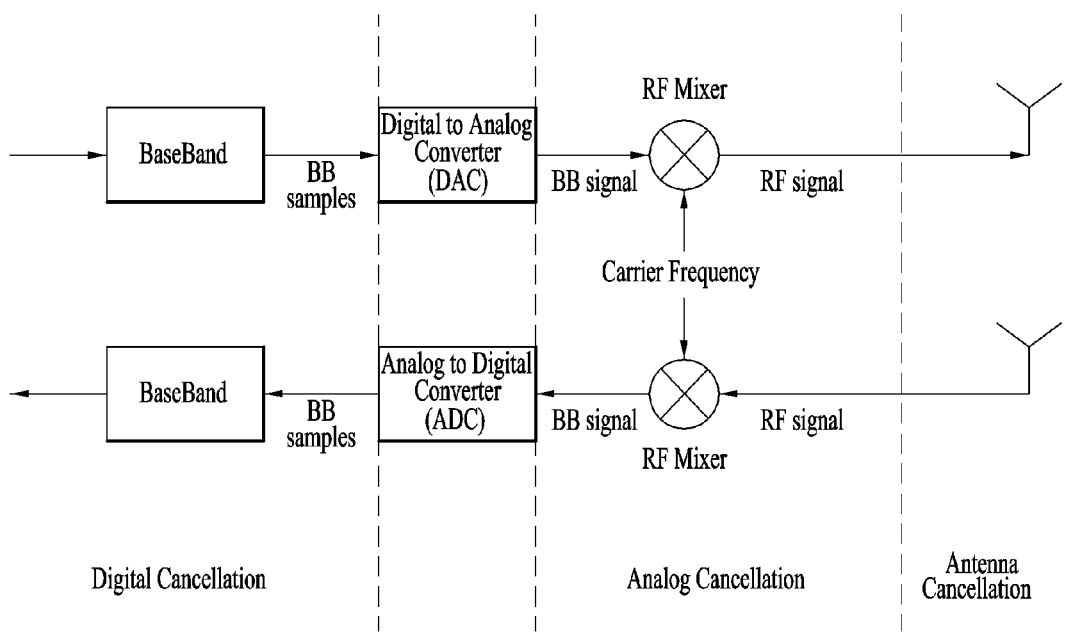
FIG. 4 is a view illustrating positions at which three Self-IC schemes are applied, in a Radio Frequency (RF) Tx and Rx end (or an RF front end) of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
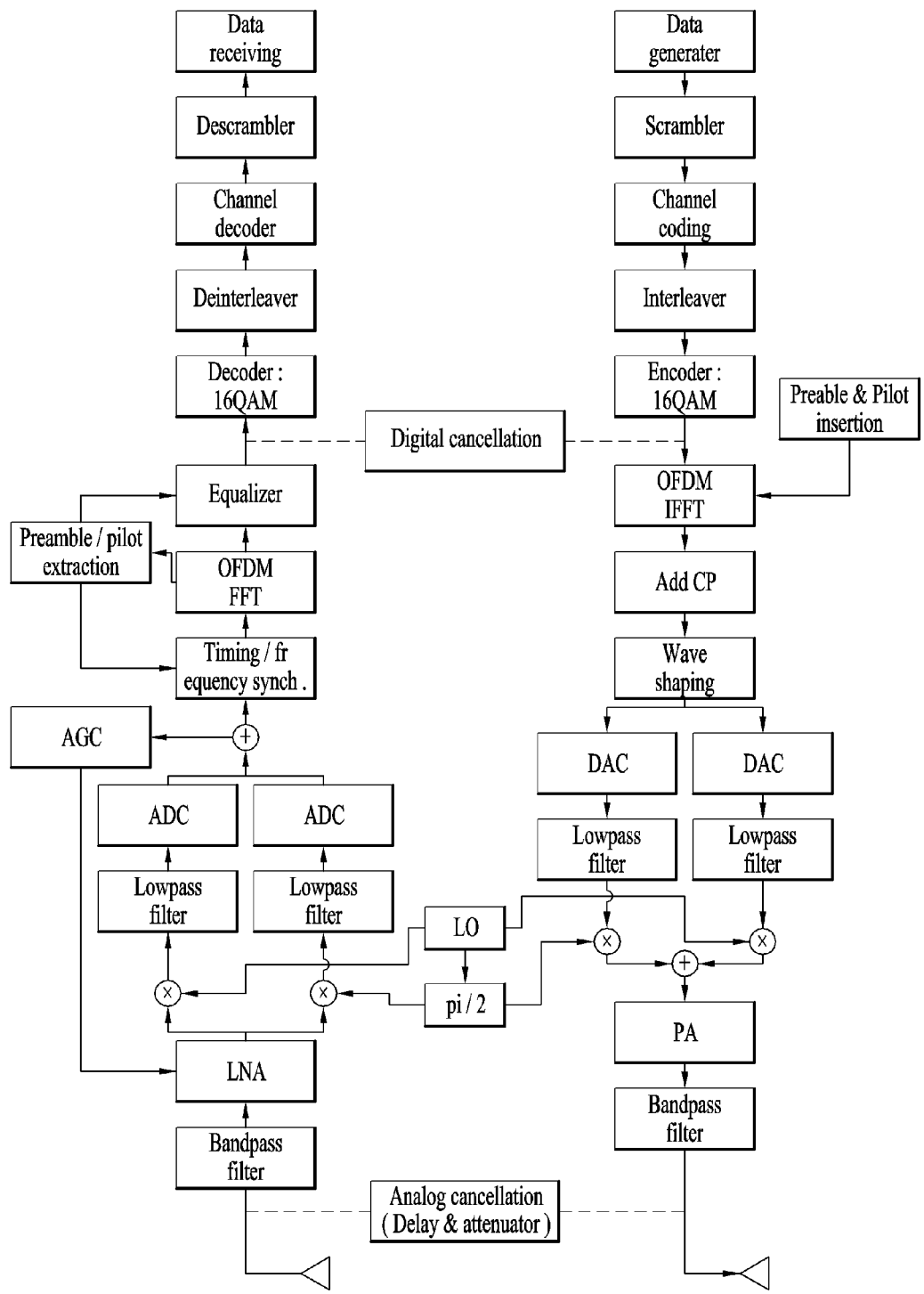
FIG. 5 is a block diagram of a Self-IC device in a proposed communication apparatus in an OFDM communication environment based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling of FDR System

Since the FDR system uses the same frequency for the Tx signal and the Rx signal, non-linear components of the RF are greatly affected. In particular, Tx signals are distorted due to nonlinear characteristics of active devices such as the power amplifier (PA) and the low noise amplifier (LNA). Due to such distortions, modeling of the Tx signal may include high-order components. Thereamong, even-order components, which affect DC periphery, can be effectively removed using the conventional AC coupling or filtering technique. However, the odd-order components, which appear in the vicinity of an existing frequency, are not easily removed compared to the even-order components, and have a great influence upon reception. Considering these nonlinear characteristics of the odd-order components, the Rx signal in the FDR system may be represented by Equation 1 below.

$$y[n] = \sum_{\substack{k=1,\ldots,K \\ k=odd}} \left( \sum_{m=1}^{L} h_{SI,k}[m] x_{SI}^k[n-m] \right) + \sum_{p=1}^{L'} h_D[p] x_D[n-p] + z[n],$$

[Equation 1]

In Equation 1, $x_{SI}^k[n]$ is a signal corresponding to a k-th order from among data having been transmitted from a device, and $h_{SI,k}[m]$ is a self-channel that the data having been transmitted from the device suffers and has a total of L multipath components. In $h_{SI,k}[m]$, if k is set to 1, $h_{SI,k}[m]$ denotes a linear component. If k is set to an odd number equal to or greater than 3, $h_{SI,k}[m]$ denotes a nonlinear component. $x_D[n]$ is desired data to be received, $h_D[p]$ is a desired channel to be applied to the desired data, and z[n] may denote an Additive White Gaussian Noise (AWGN).

If the self-interference reception (Rx) signal other than the desired data to be received as shown in Equation 1 is formed in a vector shape in a time domain, the resultant vector-shaped self-interference Rx signal is represented by the following equation 2.

$$\begin{bmatrix} y[1] \\ y[2] \\ y[3] \\ \vdots \\ y[N] \end{bmatrix} = \begin{bmatrix} x_{SI}^1[1] & \ldots & x_{SI}^1[-(L-1)] & x_{SI}^3[1] & \ldots & x_{SI}^3[-(L-1)] & \ldots & x_{SI}^{2K+1}[1] & \ldots & x_{SI}^{2K+1}[-(L-1)] \\ x_{SI}^1[2] & \ldots & x_{SI}^1[-(L-2)] & x_{SI}^3[2] & \ldots & x_{SI}^3[-(L-2)] & \ldots & x_{SI}^{2K+1}[2] & \ldots & x_{SI}^{2K+1}[-(L-2)] \\ x_{SI}^1[3] & \ldots & x_{SI}^1[-(L-3)] & x_{SI}^3[3] & \ldots & x_{SI}^3[-(L-3)] & \ldots & x_{SI}^{2K+1}[3] & \ldots & x_{SI}^{2K+1}[-(L-3)] \\ \vdots & & \vdots & \vdots & & \vdots & & \vdots & & \vdots \\ \vdots & & \vdots & \vdots & & \vdots & & \vdots & & \vdots \\ x_{SI}^1[N] & \ldots & x_{SI}^1[(N-L+1)] & x_{SI}^3[N] & \ldots & x_{SI}^3[(N-L+1)] & \ldots & x_{SI}^{2K+1}[N] & \ldots & x_{SI}^{2K+1}[(N-L+1)] \end{bmatrix}$$

[Equation 2]

$$\begin{bmatrix} h_1^1 \\ \vdots \\ h_L^1 \\ h_3^1 \\ \vdots \\ h_L^3 \\ \vdots \\ h_1^{2K+1} \\ \vdots \\ h_L^{2K+1} \end{bmatrix} + n = \Theta \begin{bmatrix} h_1^1 \\ \vdots \\ h_L^1 \\ h_3^1 \\ \vdots \\ h_L^3 \\ \vdots \\ h_1^{2K+1} \\ \vdots \\ h_L^{2K+1} \end{bmatrix} + n$$

In Equation 2, channel estimation may be achieved by execution of a pseudo inverse operation of θ. After eliminating the self-interference signal based on the previously calculated expression $\hat{h}_{SI,k}[1], \hat{h}_{SI,k}[2], \ldots, \hat{h}_{SI,k}[L]$, for k=1, ..., K (where k=odd), a desired signal to be received is detected.

The initial-stage digital self-interference cancellation (self-IC) technology has performed digital self-IC by modeling only the linear component during modeling of the self-interference signal. However, a digital self-IC technology for using not only self-interference information of legacy linear components but also self-interference information of nonlinear components so as to feasibly drive FDR has recently been proposed. In order to estimate self-interference information of nonlinear components as illustrated in Equation 1, it is important to correctly estimate channel coefficient information corresponding to each order.

The legacy technology has been designed to estimate the nonlinear components after calculating a pseudo inverse operation of a matrix configured to consider all high-order components of the transmitted signal, as shown in Equation 2. However, this legacy technology requires very complicated inverse calculation, and also requires huge calculations and additional resource allocation so as to estimate nonlinear high-order components. Therefore, reduction of complexity of digital self-IC capable of cancelling nonlinear self-interference including high-order components, and a more efficient system management process for improving efficiency of resources are essential.

The present invention proposes a channel estimation algorithm for self-IC in a full duplex radio (FDR) Tx/Rx system. In more detail, the present invention proposes a sequence design and a detection algorithm which are capable of cancelling not only self-interference information of the legacy linear components but also self-interference information of the nonlinear components.

Figure 6:
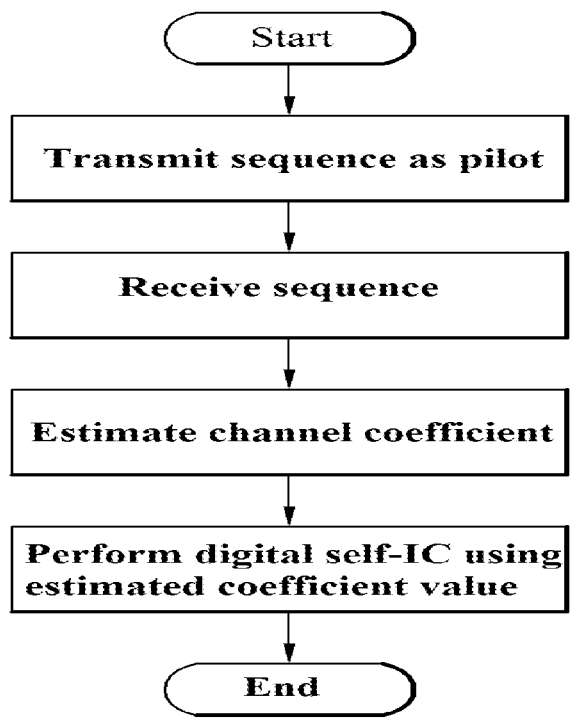
FIG. 6 is a flowchart illustrating an overall procedure of a scheme proposed by the present invention.

FIG. 6 is a flowchart illustrating an overall procedure of a scheme proposed by the present invention.

Referring to FIG. 6, a base station (BS) and a user equipment (UE) may transmit a sequence to a pilot (or RS) section so as to estimate the self-interference channel. A transmission (Tx) end may receive the sequence that has been transmitted from the Tx end, and may estimate a channel coefficient of the self-interference channel using the received sequence. In this case, an inverse operation is not requisite for the sequence, such that the sequence has a much lower complexity than legacy complexity, such that it may be possible to perform channel estimation using the sequence. Among a plurality of sequences, when using a specific sequence that is orthogonal to a cyclically-shifted sequence from among sequences having the same sequence properties, low cross correlation properties, and the same root sequence after completion of various operations (e.g., to the power of 3, to the power of 5, etc.), it may be possible to estimate $\hat{h}_{SI,k}[1], \hat{h}_{SI,k}[2], \ldots, \hat{h}_{SI,k}[L]$, for k=1, ..., K (where k=odd), such that digital self-IC is performed based on the estimated channel information.

In this case, cross-correlation properties of the sequences may be used to estimate a coefficient of the self-interference channel. From among the above-mentioned sequences, as a representative example of some sequences having the same sequence properties and low cross-correlation properties after completion of various operations such as third power calculation or fifth power calculation, a Zadoff-Chu sequence will hereinafter be given. However, the scope or spirit of the present invention is not limited to the Zadoff-Chu sequence, and the present invention can also be applied to other sequences that have the same sequence properties and low cross-correlation properties after completion of third power calculation, fifth power calculation, and the like without departing from the scope or spirit of the present invention.

Basic equations and properties of the Zadoff-Chu sequence are as follows.

A complex value of an n-th position (symbol or subcarrier) of the Zadoff-Chu sequence in which a sequence length is $N_{ZC}$ corresponding to an odd value and a root value is denoted by 'u' may be represented by the following equation 3.

$$s_u[n] = \exp\left\{\frac{-j\pi un(n+1)}{N_{zc}}\right\},\quad \text{[Equation 3]}$$

In Equation 3, $0<n<N_{ZC}$ is given, and $0<u<N_{ZC}\ \wedge\gcd(N_{ZC},u)=1$ can be obtained. In this case, gcd (a,b) is a function indicating the greatest common divisor of two integers (a, b).

The Zadoff-Chu sequence has the following basic properties.

1) If $N_{ZC}$ is an odd number, the Zadoff-Chu sequence may have periodic properties due to $N_{ZC}$, as shown in the following equation 4.

$$(s_u[n+N_{ZC}]=s_u[n]) \quad \text{[Equation 4]}$$

If $N_{ZC}$ is a prime number, discrete Fourier transform (DFT) of the Zadoff-Chu sequence may be scaled, resulting in acquisition of a time-scaled conjugated Zadoff-Chu sequence.

$(s_u[k]=s^*_u[\tilde{u}k]s_u[0]$, where $\tilde{u}$ is the multiplicative inverse of $u$ modub $N_{ZC}$)

Autocorrelation between the Zadoff-Chu sequence and the cyclically shifted sequence may have zero '0' as represented by the following equation 5.

$$R_{S_u}(k) = \sum_{n=1}^{N_{zc}-1} s_u[n]s_u^*[(n-k)_{N_{zc}}] = \begin{cases} N_{ZC}, & k=0 \\ 0, & k \neq 0 \end{cases} \quad \text{[Equation 5]}$$

Two Zadoff-Chu sequences with root values ($u_1$, $u_2$), where $|u_1-u_2|$ is relatively prime to $N_{ZC}$, may have a cross-correlation value of $$\frac{1}{\sqrt{N_{ZC}}},$$

as represented by the following equation 6.

$$C_{S_{u_1,u_2}} = \left|\sum_{n=1}^{N_{zc}-1} s_{u_1}[n]s_{u_2}^*[n]\right| = \quad \text{[Equation 6]}$$

$$\begin{cases} \frac{1}{\sqrt{N_{zc}}}, & \gcd(N_{ZC},|u_1-u_2|)=1 \\ NotAvailable, & \gcd(N_{ZC},|u_1-u_2|)>1. \end{cases}$$

A symbol structure having two symbol sequences (i.e., a first symbol sequence and a second symbol sequence obtained when phase rotation ($e^{j\pi/2}$) is multiplied by the first symbol sequence) for channel estimation is proposed, and channel estimation may be carried out using the following characteristics.

- If the same root values are given, autocorrelation between cyclic-shifted sequences becomes zero '0'.
- Cross-correlation characteristics of two sequences having different root values may be used.

Figure 7:
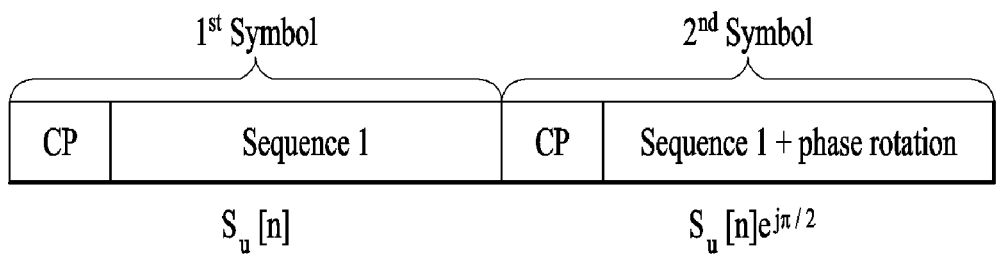
FIG. 7 is a conceptual diagram illustrating a transmission (Tx) symbol structure for estimating a nonlinear self-interference channel proposed by the present invention.

FIG. 7 is a conceptual diagram illustrating a transmission (Tx) symbol structure for estimating a nonlinear self-interference channel proposed by the present invention.

Here, the symbol may be a reference signal (RS) symbol. Referring to FIG. 7, the first symbol may include not only a sequence $s_u[n]$ in which a root value is set to 'u' and has a length $N_{ZC}$, but also a Cyclic Prefix (CP). The second symbol may include not only a sequence obtained when $e^{j\pi/2}$ is multiplied by $s_u[n]$ used in the first symbol, but also a CP. Here, although $e^{j\pi/2}$ is changed to $e^{-j\pi/2}$, the same operation result may be obtained. In addition, it may also be possible to acquire another format obtained when $e^{j\pi/2}$ is multiplied by the first symbol and $e^{j\pi/2}$ is removed from the second symbol. In other words, assuming that a phase difference between two sequences is denoted by $e^{j\pi/2}$, no problems occur.

In FIG. 7, the first symbol may be constructed on a time axis. A Zadoff-Chu sequence $$x_u[n] = e^{-j\frac{\pi un(n+1)}{N_{ZC}^{RS}}},$$

$0<n<N_{ZC}^{RS}-1$ having a root value (u) may be generated, a part corresponding to the CP length on the basis of $x_u[n]$ is duplicated, and the part is added to the front part of the symbol, resulting in implementation of $s_u[n]$.

The second symbol may be constructed as denoted by $s_u[n]\cdot e^{j\pi/2}$ or $s_u[n]\cdot e^{j\pi/2}$.

In addition, sequences may also be generated on a frequency axis using the relationship of Discrete Fourier Transform (DFT) and Inverse Discrete Fourier Transform (IDFT), such that the above time-axis sequence can be generated.

In addition, the second symbol may be dynamically constructed according to the sequence length $N_{ZC}^{RS}$, the symbol length of a system, and the CP length. In order to adjust the symbol length, the additional sequence may be cyclically constructed as shown in the following equation 3.

$$x_u[n] = \bar{x}[\mod(n, N_{ZC}^{RS})],\ 0 \leq n \leq L_{symbol}-1$$

$$\bar{x}[m] = e^{-j\frac{\pi um(m+1)}{N_{ZC}^{RS}}},\ 0 \leq m \leq N_{ZC}^{RS}-1$$

Meanwhile, the symbol length may be adjusted through adjustment of the CP length, or a zero value may be inserted into the rear part of the symbol such that a satisfactory result can be acquired.

It is assumed that the channels of two symbols are identical to each other.

For convenience of description, the value of u is set to 1 (i.e., u=1), the Rx signal of the first symbol acquired when the corresponding symbol structure is applied to Equation 2 is represented by the following equation 7.

$$y_1 = \begin{bmatrix} y[1] \\ y[2] \\ \vdots \\ y[N] \end{bmatrix} = [s_1^0\ s_1^1\ \ldots\ s_1^{L-1}] \quad \text{[Equation 7]}$$

-continued $$\begin{bmatrix} h_1^1 \\ h_2^1 \\ \vdots \\ h_L^1 \end{bmatrix} + [s_3^0 \; s_3^1 \; \ldots \; s_3^{L-1}] \begin{bmatrix} h_1^3 \\ h_2^3 \\ \vdots \\ h_L^3 \end{bmatrix} + \ldots +$$

$$[s_{2K+1}^0 \; s_{2K+1}^1 \; \ldots \; s_{2K+1}^{L-1}] \begin{bmatrix} h_1^{2K+1} \\ h_2^{2K+1} \\ \vdots \\ h_L^{2K+1} \end{bmatrix} + n$$

In Equation 7, $s_u^c$ is a sequence vector which has a root value (u) and is cyclically shifted by a specific value (c). The root values of third-order and high-order components may be determined by characteristics shown in the following equation 8.

$$s_u^k[n] = \left[\exp\left\{\frac{-j\pi u n(n+1)}{N_{ZC}}\right\}\right]^k \quad \text{[Equation 8]}$$
$$= \exp\left\{\frac{-j\pi k u n(n+1)}{N_{ZC}}\right\}$$
$$= s_{ku}[n].$$

In Equation 7, if $(s_1^0)^H$ is multiplied by the Rx signal, the following equation 9 is obtained.

$$z_1^0 = [N_{ZC} \; 0 \; \ldots \; 0] \begin{bmatrix} h_1^1 \\ h_2^1 \\ \vdots \\ h_L^1 \end{bmatrix} + [d_{1,3}^{0,0} \; d_{1,3}^{0,1} \; \ldots \; d_{1,3}^{0,L-1}] \quad \text{[Equation 9]}$$

$$\begin{bmatrix} h_1^3 \\ h_2^3 \\ \vdots \\ h_L^3 \end{bmatrix} + \ldots + [d_{1,2K+1}^{0,0} \; d_{1,2K+1}^{0,1} \; \ldots \; d_{1,2K+1}^{0,L-1}] \begin{bmatrix} h_1^{2K+1} \\ h_2^{2K+1} \\ \vdots \\ h_L^{2K+1} \end{bmatrix}$$

$$+ n = N_{ZC} h_1^1 + I_{1,3}^0 + \ldots + I_{1,2K+1}^0 + n'$$

In Equation 9, $d_{u1,u2}^{k1,k2} = (s_{u1}^{k1})^H \cdot s_{u2}^{k2}$ may be acquired, and $l_{u1,u2}^k$ is represented by the following equation.

$$I_{u1,u2}^k = [d_{u1,u2}^{k,0} \; d_{u1,u2}^{k,1} \; \ldots \; d_{u1,u2}^{k,L-1}] \begin{bmatrix} h_1^{u2} \\ h_2^{u2} \\ \vdots \\ h_L^{u2} \end{bmatrix}.$$

Accordingly, a general expression may be represented by the following equation 10.

$$Z_m^k = I_{m,1}^k + I_{m,3}^k + \ldots + N_{ZC} h_m^{k+1} + \ldots + I_{m,3}^k + n' \quad \text{[Equation 10]}$$
for $m = 1, 3, \ldots, 2K+1$ Similar to Equation 4, the second symbol $y_2$ may be represented by the following equation 11.

$$y_2 = e^{j\pi/2}[s_1^0 \; s_1^1 \; \ldots \; s_1^{L-1}] \begin{bmatrix} h_1^1 \\ h_2^1 \\ \vdots \\ h_L^1 \end{bmatrix} + \quad \text{[Equation 11]}$$

$$e^{j3\pi/2}[s_3^0 \; s_3^1 \; \ldots \; s_3^{L-1}] \begin{bmatrix} h_1^3 \\ h_2^3 \\ \vdots \\ h_L^3 \end{bmatrix} + \ldots +$$

$$e^{j(2K+1)\pi/2}[s_{2K+1}^0 \; s_{2K+1}^1 \; \ldots \; s_{2K+1}^{L-1}] \begin{bmatrix} h_1^{2K+1} \\ h_2^{2K+1} \\ \vdots \\ h_L^{2K+1} \end{bmatrix} +$$

$$n_2$$

Differently from demodulation of the first symbol, the phase is additionally considered, such that the following equation 12 can be obtained.

$$z_m^{-k} = (s_m^k e^{jm\pi/2})^H y = (-1)^{(m-1)/2} l_{m,1}^k + (-1)^{(m-1)/2} l_{m,3}^k + \ldots + N_{ZC} h_m^{k+1} + \ldots + (-1)^{(m-1)/2} l_{m,3}^k + n_2' \text{ for }$$
$$m = 1, 3, \ldots, 2K+1 \quad \text{[Equation 12]}$$

If Equation 10 and Equation 12 are added, the estimated value of a desired result $h_m^k$ may be denoted by $\hat{h}_m^k$. A detailed description thereof will hereinafter be described with reference to the following embodiments.

Embodiment 1

In Embodiment 1, it is assumed that the channel length (L) is set to 5 (i.e., L=5) and the maximum non-linearity order is set to 5. In this case, channel estimation may be achieved according to the following order.

1) First, a method for calculating the first channel (tap) of the first order of $\hat{h}_1^1$ is as follows.

2) The following equation can be obtained using the above-mentioned equations 10 and 12.

$$z_1^0 = N_{ZC} h_1^1 + l_{1,3}^0 + l_{1,5}^0 + n'$$

$$z_1^{-0} = N_{ZC} h_1^1 \ldots l_{1,3}^0 + l_{1,5}^0 + n_2'$$

The above two expressions can be obtained, and the following equation can be obtained using the sum of the above two expressions.

$$\hat{h}_1^1 = \frac{z_1^0 + z_1^{-0}}{2N_{ZC}} = h_1^1 + I_{1,5}^0/N_{ZC} + \tilde{n}/N_{ZC}$$

3) In addition, $\hat{h}_2^1, \ldots, \hat{h}_5^1$ can be obtained using the above-mentioned expression.

4) The estimated value $\hat{h}_1^3$ of the $3^{rd}$-order first channel (tap) can be calculated as follows.

In the same manner, the following expressions can be acquired using Equations 10 and 12.

$$z_3^0 = l_{3,1}^0 + N_{ZC} h_1^3 + l_{3,5}^0 + n'$$

$$z_3^{-0} = \ldots l_{3,1}^0 + N_{ZC} h_1^3 - l_{3,5}^0 + n_2'$$

The above two expressions are obtained, and the following expression equation can be acquired using the above two expressions.

$$\hat{h}_1^3 = \frac{z_3^0 + z_3^{-0}}{2N_{ZC}} = h_1^3 + \tilde{n}/N_{ZC}$$

5) In addition, $\hat{h}_2^3, \ldots, \hat{h}_5^3$ may also be calculated in the same manner as described above.

6) Finally, the fifth-order first channel (tap) $(\hat{h}_1^5)$ may be pre-removed from the Rx signal (y) using linear components $(\hat{h}_1^1, \ldots, \hat{h}_5^1)$ and the value of $s_1$. Thereafter, if the calculation process is achieved using the following schemes, the following expression can be obtained.

$z_5^0 = l_{5,3}^0 + N_{ZC} h_1^5 + n' + \text{residual}$ $z_5^{-0} = \ldots l_{5,3}^0 + N_{ZC} h_1^5 + n_2' + \text{residual}$ In the above expressions, "residual" may denote errors caused by channel estimation errors of $$\left(h_m^1 - \hat{h}_m^1\right).$$

As a result, the following expression can be obtained according to the above-mentioned results.

$$\hat{h}_1^5 = \frac{z_5^0 + z_5^{-0}}{2N_{ZC}} = h_1^5 + (\tilde{n} + +\text{residual})/N_{ZC}$$

7) $\hat{h}_1^5, \ldots, \hat{h}_5^5$ may also be acquired in the same manner as described above.

Embodiment 2

It is assumed that the channel length (L) is set to 5 (i.e., L=5) and the maximum non-linearity order is set to 9. In this case, channel estimation may be achieved according to the following order.

1) First, a method for calculating the first channel (tap) of the first order of $\hat{h}_1^1$ is as follows.

The following expression can be obtained using the above-mentioned equations 10 and 12.

$z_1^0 = N_{ZC} h_1^1 + l_{1,3}^0 + l_{1,5}^0 + l_{1,7}^0 l_{1,9}^0 + n'$ $z_1^{-0} = N_{ZC} h_1^1 \ldots l_{1,3}^0 + l_{1,5}^0 \ldots l_{1,7}^0 l_{1,9}^0 + n_2'$ The above two expressions are obtained, and the following expression can be acquired using the above two expressions.

$$\hat{h}_1^1 = \frac{z_1^0 + z_1^{-0}}{2N_{ZC}} = h_1^1 + l_{1,5}^0/N_{ZC} + l_{1,9}^0/N_{ZC} + \tilde{n}/N_{ZC}$$

2) In addition, $\hat{h}_2^1, \ldots, \hat{h}_5^1$ may also be calculated in the same manner as described above.

3) The estimated value $\hat{h}_1^3$ of the $3^{rd}$-order first channel (tap) can be calculated as follows.

In the same manner, the following expressions can be acquired using Equations 10 and 12.

$z_3^0 = l_{3,1}^0 + N_{ZC} h_1^3 + l_{3,5}^0 + l_{3,5}^0 + l_{3,7}^0 + l_{3,9}^0 + n'$ $z_3^{-0} = \ldots l_{3,1}^0 + N_{ZC} h_1^3 \ldots l_{3,5}^0 + l_{3,5}^0 + l_{3,7}^0 \ldots l_{3,9}^0 + n'$ After the above two expressions are obtained, the following expression can be obtained using the sum of the above two expressions.

$$\hat{h}_1^3 = \frac{z_3^0 + z_3^{-0}}{2N_{ZC}} = h_1^3 + l_{3,7}^0/N_{ZC} + \tilde{n}/N_{ZC}$$

4) In addition, $\hat{h}_2^3, \ldots, \hat{h}_5^3$ may be acquired in the same manner as described above.

5) Thereafter, the fifth-order first channel (tap) $(\hat{h}_1^5)$ may be pre-removed from the Rx signal (y) using linear components $(\hat{h}_1^1, \ldots, \hat{h}_5^1)$ and the value of $s_1$. Thereafter, if the calculation process is achieved using the following schemes, the following expressions can be obtained.

$z_5^0 = l_{5,3}^0 + N_{ZC} h_1^5 + l_{5,7}^0 + l_{5,9}^0 + n' + \text{residual}$ $z_5^{-0} = \ldots l_{5,3}^0 + N_{ZC} h_1^5 \ldots l_{5,7}^0 + l_{5,9}^0 + n_2' + \text{residual}$ In the above expressions, "residual" may denote errors caused by channel estimation errors of $(h_m^1 - \hat{h}_m^1)$. As a result, the following expression can be finally obtained according to the above-mentioned results.

$$\hat{h}_1^5 = \frac{z_5^0 + z_5^{-0}}{2N_{ZC}} = h_1^5 + (\tilde{n} + +\text{residual} + l_{5,9}^0)/N_{ZC}$$

6) $\hat{h}_1^5, \ldots, \hat{h}_5^5$ may also be acquired in the same manner as described above.

7) Thereafter, the seventh-order first channel (tap) $(\hat{h}_1^7)$ may be pre-removed from the Rx signal (y) using linear components $(\hat{h}_1^3, \ldots, \hat{h}_5^3)$ and the value of $s_3$. Thereafter, if the calculation process is achieved using the following schemes, the following expressions can be obtained.

$z_7^0 = l_{7,1}^0 + l_{7,5}^0 + N_{ZC} h_1^7 + l_{5,9}^0 + n' + \text{residual}$ $z_7^{-0} = \ldots l_{7,1}^0 \ldots l_{7,5}^0 + N_{ZC} h_1^7 \ldots l_{5,9}^0 + n_2' + \text{residual}$ The following expression can be acquired using the above expressions.

$$\hat{h}_1^7 = \frac{z_7^0 + z_7^{-0}}{2N_{ZC}} = h_1^7 + (\tilde{n} + +\text{residual})/N_{ZC}$$

8) $\hat{h}_2^7, \ldots, \hat{h}_5^7$ may also be acquired in the same manner as described above.

Figure 8:
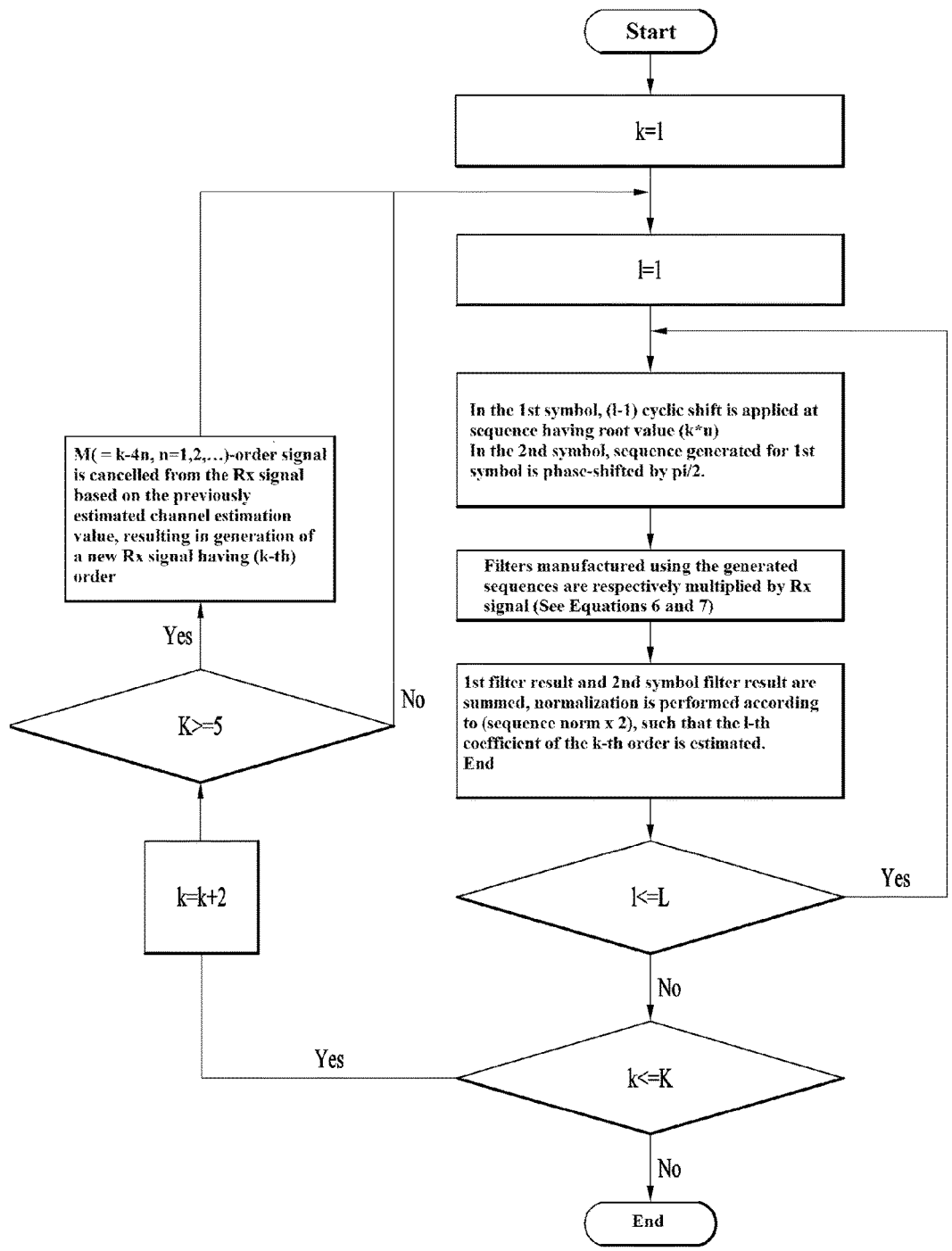
FIG. 8 is a flowchart illustrating a detailed procedure for estimating a coefficient of a self-interference channel according to an embodiment of the present invention.

9) In the same manner as described above, the ninth order value is first removed from the Rx signal using the channel estimation values corresponding to the $1^{st}$ order and the fifth order, and is then obtained. Finally, the algorithm for channel estimation may be based on the procedures of FIG. 8. FIG. 8 is a detailed procedure of self-interference channel coefficient estimation.

In conclusion, data transmission is achieved using the symbol structure of FIG. 7, and the self-interference channel estimation value can be obtained through the procedures of FIG. 8. Thereafter, the obtained value is combined with the sequence, such that self-interference cancellation (SIC) can be achieved.

Referring to FIG. 8, in the $1^{st}$ symbol, (1-1) cyclic shift (CS) is applied to a sequence having a root value (k*u). In the $2^{nd}$ symbol, a sequence generated for the $1^{st}$ symbol is phase-shifted by π/2. Thereafter, filters (i.e., Equation 10 and Equation 12) manufactured from the generated sequences are respectively multiplied by the Rx signal. The first symbol filter result and the second symbol filter result are added, and normalization of (sequence norm *2) is applied to the added result, such that the l-th coefficient of the k-th order is estimated. In this case, if the channel length (L) is equal to or longer than the value of 'l', the above steps are repeated. If the value of 'l' is higher than L and a maximum nonlinear order (K) is equal to or higher than the value of k, the value of k may be increased by 2. In this case, if the maximum nonlinear order (K) is equal to or higher than 5, the M(=k−4n, n=1, 2, ... )-th order signal is removed on the basis of the channel estimation value that has been previously estimated from the Rx signal, such that a k-th order Rx signal is newly generated. Meanwhile, if K is lower than 'k', this algorithm may be finished.

As described above, according to transmission based on the symbol structure of FIG. 7 and the channel estimation procedure of FIG. 8, the embodiments of the present invention may have lower complexity as compared to the legacy art and at the same time may efficiently remove (or cancel) the nonlinear self-interference through a combination of the sequence property and the symbol structure.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

Embodiments of the present invention may be implemented using various means. For instance, embodiments of the present invention can be implemented using hardware, firmware, software and/or any combinations thereof. In the case of implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and the like.

In the case of implementation by firmware or software, a method according to each embodiment of the present invention can be implemented by modules, procedures, and/or functions for performing the above-explained functions or operations. Software code is stored in the memory unit and is then drivable by the processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The method and apparatus for estimating the nonlinear self-interference channel in a wireless communication system supporting full duplex radio (FDR) can be applied to various communication systems for industrial purposes.

What is claimed is:

1. A method for estimating a nonlinear self-interference channel in a wireless communication system supporting a full duplex radio (FDR) scheme, the method comprising:
    applying a first sequence to a first symbol, the first sequence being a cyclic-shifted sequence of a third sequence;
    applying, to a second symbol, a second sequence which is a π/2 phase-shifted sequence of the first sequence; and
    transmitting the first symbol and the second symbol,
    wherein, when a same root value is used for both the third sequence and the first sequence, an autocorrelation between the first sequence and the third sequence is set to zero '0' and the third sequence is a Zadoff-Chu root sequence.

2. The method according to claim 1, further comprising:
    estimating a self-interference signal due to transmission of the first symbol and the second symbol.

3. The method according to claim 1, wherein the first symbol includes a cyclic prefix (CP) in a head portion thereof, and the second symbol includes a cyclic prefix (CP) in a head portion thereof.

4. The method according to claim 1, wherein the first symbol and the second symbol are consecutive symbols in a time domain.

5. The method according to claim 1, wherein:
    each of the first symbol and the second symbol is a reference signal (RS) symbol.

6. An apparatus for estimating a nonlinear self-interference channel in a wireless communication system supporting a full duplex radio (FDR) scheme, the apparatus comprising:
    a transceiver coupled to a processor; and
    the processor configured to:
    apply a first sequence to a first symbol, the first sequence being a cyclic-shifted sequence of a third sequence,
    apply, to a second symbol, a second sequence is a π/2 phase-shifted sequence of the first sequence, and
    transmit the first symbol and the second symbol,
    wherein, when a same root value is used for both the third sequence and the first sequence, an autocorrelation between the first sequence and the third sequence is set to zero '0' and the third sequence is a Zadoff-Chu root sequence.

7. The apparatus according to claim 6, wherein the processor is configured to estimate a self-interference signal due to transmission of the first symbol and the second symbol.

8. The apparatus according to claim 6, wherein the first symbol includes a cyclic prefix (CP) in a head portion thereof, and the second symbol includes a cyclic prefix (CP) in a head portion thereof.

9. The apparatus according to claim 6, wherein the first symbol and the second symbol are consecutive symbols in a time domain.

10. The apparatus according to claim 6, wherein:
   each of the first symbol and the second symbol is a reference signal (RS) symbol.

* * * * *